United States Patent
Li et al.

(10) Patent No.: US 12,424,248 B2
(45) Date of Patent: Sep. 23, 2025

(54) DEVICES AND METHODS FOR METAL ORGANIC FRAMEWORK (MOF) BASED OXYGEN REPLENISHMENT IN DATA STORAGE DEVICES

(71) Applicant: Western Digital Technologies, Inc., San Jose, CA (US)

(72) Inventors: Dongying Li, San Jose, CA (US); Mehdi Habibollahzadeh, San Jose, CA (US); Sukumar Rajauria, San Jose, CA (US); Qing Dai, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 176 days.

(21) Appl. No.: 18/492,559

(22) Filed: Oct. 23, 2023

(65) Prior Publication Data

US 2025/0131946 A1 Apr. 24, 2025

(51) Int. Cl.
*G11B 33/12* (2006.01)
*B01D 53/04* (2006.01)
*G11B 25/04* (2006.01)
*G11B 33/14* (2006.01)

(52) U.S. Cl.
CPC ........ *G11B 33/127* (2013.01); *B01D 53/0438* (2013.01); *B01D 53/0462* (2013.01); *G11B 25/043* (2013.01); *G11B 33/1466* (2013.01); *B01D 2253/204* (2013.01)

(58) Field of Classification Search
CPC ..................................................... G06F 1/181
See application file for complete search history.

(56) References Cited

U.S. PATENT DOCUMENTS

| | | |
|---|---|---|
| 10,957,363 B1 | 3/2021 | Brand |
| 11,763,853 B2 | 9/2023 | Luebben et al. |
| 11,783,867 B2 | 10/2023 | Luebben et al. |
| 2005/0264926 A1 | 12/2005 | Burts-Cooper et al. |
| 2009/0296271 A1 | 12/2009 | Feliss et al. |
| 2015/0105250 A1* | 4/2015 | Weston .............. B01J 20/28069 96/108 |
| 2021/0043232 A1 | 2/2021 | Luebben et al. |
| 2021/0043233 A1* | 2/2021 | Luebben .............. G11B 33/022 |
| 2021/0287719 A1 | 9/2021 | Luebben et al. |

(Continued)

FOREIGN PATENT DOCUMENTS

CN 112337407 A 2/2021

Primary Examiner — Jerry Wu

(57) ABSTRACT

A data storage device may include an enclosure and a metal organic framework (MOF) container situated within an enclosure interior. The MOF container contains a MOF configured to store captive molecular units and to release the captive molecular units in gaseous form into the enclosure interior. A method of manufacturing the data storage device may include charging the MOF, attaching the MOF container to the enclosure interior, and sealing the enclosure after attaching the MOF container to the interior of the enclosure. A method of adjusting an amount of gas in a sealed data storage device may comprise including a MOF container within an interior of the sealed data storage device, the MOF container containing a MOF, charging the MOF, and, after the sealed data storage device has been placed into service, the MOF releasing captive molecular units into the interior of the sealed data storage device.

17 Claims, 5 Drawing Sheets

(56) References Cited

U.S. PATENT DOCUMENTS

| | | |
|---|---|---|
| 2022/0148626 A1 | 5/2022 | Luebben et al. |
| 2022/0301596 A1 | 9/2022 | Block et al. |
| 2022/0406341 A1 | 12/2022 | Luebben et al. |
| 2023/0335164 A1 | 10/2023 | Luebben et al. |
| 2024/0110901 A1 | 4/2024 | Thomas et al. |

* cited by examiner

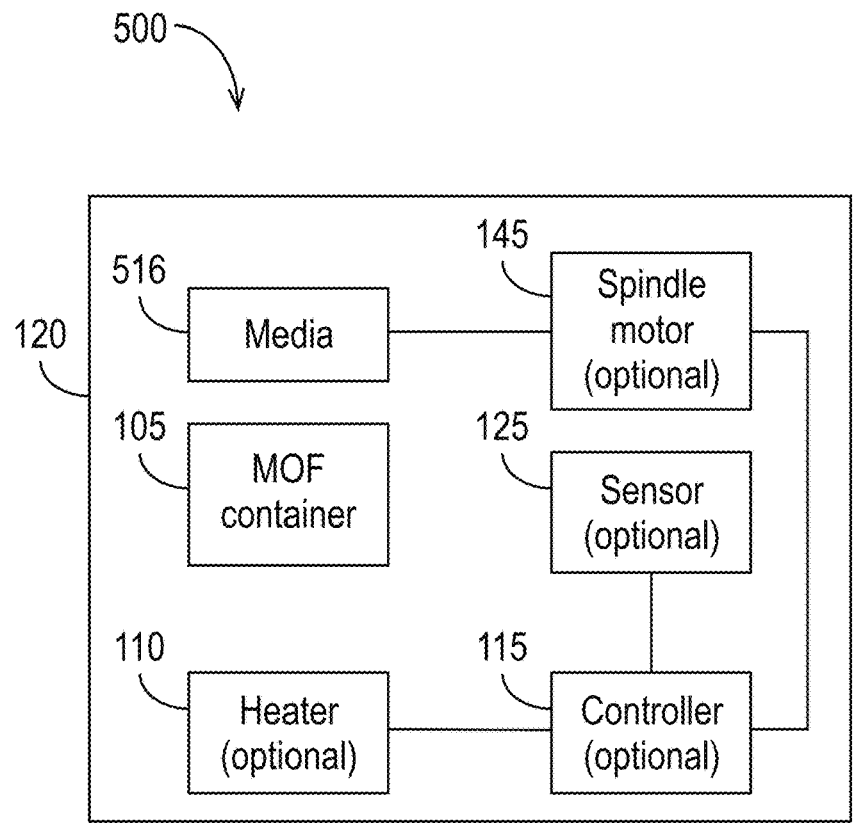
FIG. 2
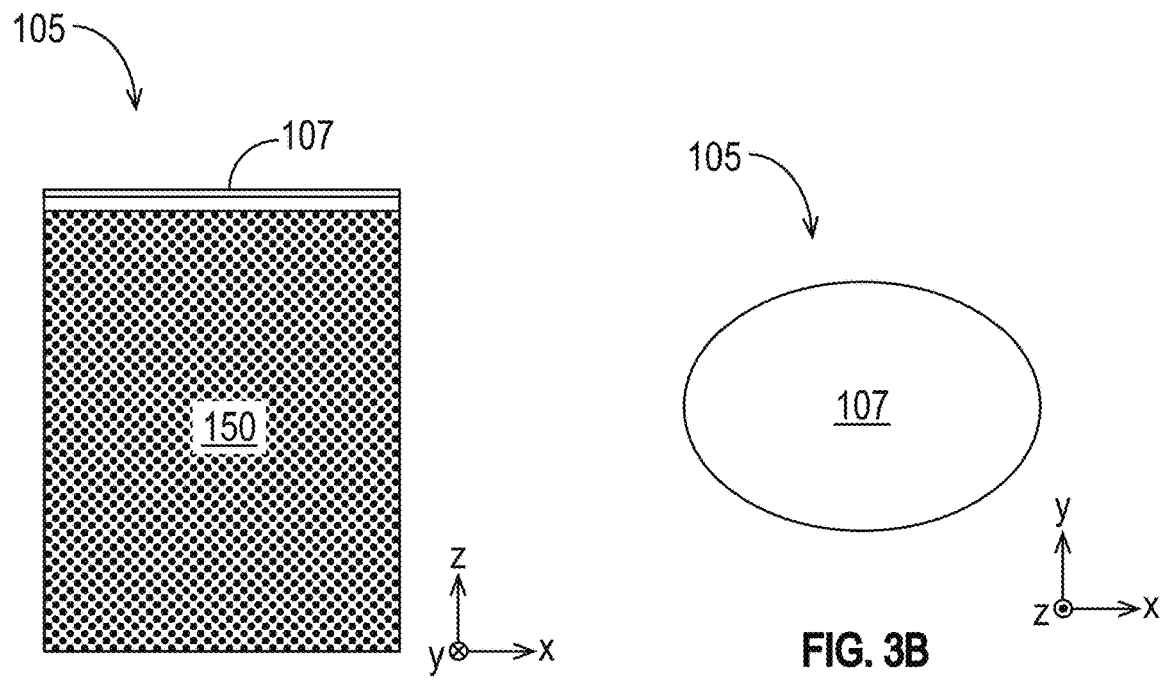
FIG. 3A
FIG. 3B

DEVICES AND METHODS FOR METAL ORGANIC FRAMEWORK (MOF) BASED OXYGEN REPLENISHMENT IN DATA STORAGE DEVICES

BACKGROUND

Data storage systems are used to store large amounts of information. A data storage system typically includes a read/write transducer for retrieving and storing information. Some data storage systems use rotating storage devices, such as rotating optical devices (e.g., CD and DVD drives) or hard disk drives containing rotating magnetic disks (also referred to as platters or media). In some such data storage systems, a suspended slider supports a head that includes the read/write transducer. The slider provides mechanical support for the head and the electrical connections between the head and the rest of the data storage system.

When the data storage system is in operation, the slider floats a small distance above the recording medium (e.g., a hard disk in a hard disk drive), which rotates at high speeds. Components of the data storage system move the slider and, therefore, the head to a desired radial position over the surface of the rotating medium, and the head reads or writes information. The slider rides on a cushion or bearing of air or gas created above the surface of the medium as the disk rotates at its operating speed. The slider has an air-bearing surface (ABS) that faces the medium. The ABS is designed to generate an air-bearing force that counteracts a preload bias that pushes the slider toward the medium. The ABS causes the slider to fly above and out of contact with the medium.

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, may result in a need for write heads that incorporate higher magnetic moment materials, or techniques such as perpendicular recording (or both).

Another solution uses heat to lower the effective coercivity of a localized region on the magnetic media surface and writes data within this heated region. The data state becomes "fixed" upon cooling the media to ambient temperatures. This technique is broadly referred to as "thermally assisted (magnetic) recording" (TAR or TAMR), "energy assisted magnetic recording" (EAMR), or "heat-assisted magnetic recording" (HAMR). The term "HAMR" is used herein to refer to all of TAR, TAMR, EAMR, and HAMR.

In HAMR, a magnetic recording material with high magneto-crystalline anisotropy ($K_1$) is heated locally during writing to lower the coercivity enough for writing to occur, but the coercivity/anisotropy is high enough that the recorded bits are thermally stable at the ambient temperature of the disk drive (i.e., the normal operating or "room" temperature of approximately 15-30 degrees Celsius). In some proposed HAMR systems, the magnetic recording material is heated to near or above its Curie temperature. The recorded data may then be read back at ambient temperature by a conventional magnetoresistive read head. HAMR disk drives have been proposed for both conventional continuous media, wherein the magnetic recording material is a continuous layer on the disk, and for bit-patterned media (BPM), in which the magnetic recording material is patterned into discrete data islands or "bits."

One type of HAMR data storage device uses a laser source and an optical waveguide coupled to a near-field transducer (NFT) for heating the recording material on the media. A "near-field" transducer refers to "near-field optics," wherein light is passed through a first element with sub-wavelength features and the light is coupled to a second element, such as a substrate (e.g., of a magnetic recording medium), located a subwavelength distance from the first element. The NFT is typically located at the air-bearing surface (ABS) of an air-bearing slider that also supports the read/write head and rides or "flies" above the media surface. An NFT may have a generally triangular output end, such that an evanescent wave generated at a surface of the waveguide couples to surface plasmons excited on the surface of the NFT, and a strong optical near-field is generated at the apex of the triangular output end.

One potential issue with HAMR devices is that excessive heating of the NFT can cause performance degradation and eventually failure of the data storage device. One possible cause of failure due to excessive heating may be due to adsorption of carbonaceous material on the slider overcoat near the NFT tip. Hydrocarbon molecules from the recording media overcoat and lubricant can become mobile at elevated temperatures and adsorb on the ABS of the slider. Over time, these molecules can form a "smear" that absorbs power from the laser source and causes the NFT, which normally operates at very high temperatures, to become even hotter than usual. The heat transfer can result in diffusion of the NFT metal until the NFT tip rounds and recording degrades, eventually possibly leading to failure of the data storage device.

Smear can contain materials such as carbon, silicon, and/or nitrogen. Consequently, if the smear is hot enough while in the presence of enough oxygen, it can oxidize and produce glassy products (e.g., materials that have amorphous, non-crystalline structures similar to that of glass, such as, e.g., $SiO_2$, NO, etc.) and/or carbon-based gases (e.g., CO, $CO_2$, etc.), or combinations thereof. The produced gases dissipate, and the HAMR head's laser light can typically penetrate the resulting glassy products (if present) without heating them, which provides the desired heating of the recording media while preventing excessive heating of the NFT, which can substantially improve the lifetime of the NFT.

Many older data storage devices operate in a standard air (e.g., nitrogen, oxygen, and water vapor mixture) atmosphere. Spinning recording media in hard disk drives at high revolutions per minute against the friction of an air atmosphere is largely inefficient and requires a certain amount of power. To address this inefficiency, a data storage device can be filled at least partially with a lower-density gas, such as helium or hydrogen, and sealed to control and maintain the internal environment of the data storage device. Sealing mitigates or prevents leakage of internal gases from within the data storage device. The use of helium, which has a density that is approximately one-seventh that of air, reduces friction and vibration in the data storage device, thereby creating less drag and turbulence. Consequently, by running the data storage device in a less-dense atmosphere, such as an atmosphere of helium or a mixture of helium and oxygen, friction on the recording media is reduced, thereby causing the recording media to require less power in order to spin at a similar rate as the recording media in data storage devices that operate in standard air conditions. The use of helium generally also reduces the operating temperature of the data storage device, as well as the amount of noise it generates.

Smear is common in data storage devices that are sealed and contain helium, because there are far fewer oxygen molecules in such devices than in standard-atmosphere data storage devices. One side-effect of the (desirable) oxidation of smear in a sealed data storage device is that it consumes oxygen molecules sealed within the interior of the data storage device, which reduces the number of oxygen molecules available for oxidation as the data storage device ages. In addition to the oxidation of smear, other components in data storage devices can consume oxygen via oxidation (e.g., platter surface oxidation, connector and/or interface oxidation, PCB oxidation, head and/or actuator oxidation, etc.). As a result, the quantity of oxygen molecules available may eventually be insufficient to promote oxidation of the smear, which can cause the data storage device to fail. The loss rate of oxygen also tends to be exacerbated as the temperature of the data storage device increases.

Therefore, there is a need for improvements.

SUMMARY

This summary represents non-limiting embodiments of the disclosure.

Disclosed herein are data storage devices that include metal organic framework (MOF) containers that contain a MOF material. The MOF material stores captive molecular units and can release those captive molecular units in gaseous form (e.g., oxygen) as the data storage device operates. In some embodiments, the disclosed techniques replenish oxygen consumed by oxidation or other processes.

In some aspects, the techniques described herein relate to a data storage device, including: an enclosure; and a metal organic framework (MOF) container situated within an interior of the enclosure, wherein the MOF container contains a MOF configured to store captive molecular units and to release the captive molecular units in gaseous form into the interior of the enclosure.

In some aspects, the captive molecular units include oxygen ($O_2$).

In some aspects, the MOF includes at least one of: Cu-BTC, MIL-101 Composite, UMCM-152 (ANUGIA), or Mg-MOF-74.

In some aspects, the MOF container includes a permeable membrane and/or orifice configured to allow the captive molecular units to exit the MOF container, wherein a pressure inside the MOF container exceeds a pressure in the interior of the enclosure.

In some aspects, the data storage device further includes: a heater situated within the interior of the enclosure, wherein the heater is configured to heat the MOF. In some aspects, the data storage device further includes: a controller coupled to and configured to control the heater. In some aspects, the controller is further configured to set or adjust a heat output of the heater based at least in part on an indication of an amount or concentration of a gas within the interior of the enclosure.

In some aspects, the data storage device further includes a sensor communicatively coupled to the controller, wherein the controller is further configured to obtain the indication of the amount or concentration of the gas within the interior of the enclosure from the sensor. In some aspects, the indication of the amount or concentration of the gas within the interior of the enclosure is estimated based at least in part on one or more of: a spindle motor current, a spindle motor power consumption, a proxy for the spindle motor current, or a proxy for the spindle motor power consumption.

In some aspects, the controller is configured to control the heater by setting or adjusting a heat output of the heater based at least in part on an indication of a temperature within the interior of the enclosure.

In some aspects, the data storage device further includes: a recording media situated within the interior of the enclosure; and a heat-assisted magnetic recording (HAMR) head situated within the enclosure and configured to record data to and read data from the recording media.

In some aspects, the techniques described herein relate to a method of making a data storage device comprising a MOF container, the method including: charging the MOF; attaching the MOF container to the interior of the enclosure; and sealing the enclosure after attaching the MOF container to the interior of the enclosure.

In some aspects, the techniques described herein relate to a method of adjusting an amount of gas in a sealed data storage device, the method including: including a metal organic framework (MOF) container within an interior of the sealed data storage device, the MOF container containing a MOF; charging the MOF; and after the sealed data storage device has been placed into service, the MOF releasing captive molecular units into the interior of the sealed data storage device. The MOF may be charged before or after being placed into the MOF container.

In some aspects, the method further includes: obtaining an estimated current gas level in the interior of the sealed data storage device, and the MOF releasing the captive molecular units into the interior of the sealed data storage device is at least in part in response to the estimated current gas level in the interior of the sealed data storage device.

In some aspects, the MOF releasing the captive molecular units into the interior of the sealed data storage device is at least in part in response to the estimated current gas level in the interior of the sealed data storage device being below a threshold.

In some aspects, obtaining the estimated current gas level in the interior of the sealed data storage device includes: obtaining an indication of a spindle motor current or a spindle motor power consumption.

In some aspects, the MOF releasing the captive molecular units into the interior of the sealed data storage device is based at least in part on a model. In some aspects, the model accounts for a material in the MOF.

In some aspects, the model also accounts for at least one of (a) an operating temperature of the sealed data storage device, (b) an operating time of the sealed data storage device, or (c) an expected lifetime of the sealed data storage device.

In some aspects, the method further includes heating the MOF, and the MOF releasing the captive molecular units into the interior of the sealed data storage device is a result of heating the MOF.

In some aspects, heating the MOF includes: a controller of the sealed data storage device causing a heater of the sealed data storage device to heat the MOF container.

In some aspects, the method further includes subjecting the MOF to a magnetic field, and the MOF releasing the captive molecular units into the interior of the sealed data storage device is a result of subjecting the MOF to the magnetic field.

In some aspects, the method further includes exposing the MOF to light, and the MOF releasing the captive molecular units into the interior of the sealed data storage device is a result of exposing the MOF to the light.

In some aspects, the method further includes recharging or replacing the MOF.

BRIEF DESCRIPTION OF THE DRAWINGS

Objects, features, and advantages of the disclosure will be readily apparent from the following description of certain embodiments taken in conjunction with the accompanying drawings in which:

FIG. 2 illustrates an example of some components of a data storage device in accordance with some embodiments.

FIGS. 3A and 3B illustrate an example of the MOF container in accordance with some embodiments.

DETAILED DESCRIPTION

Figure 1:
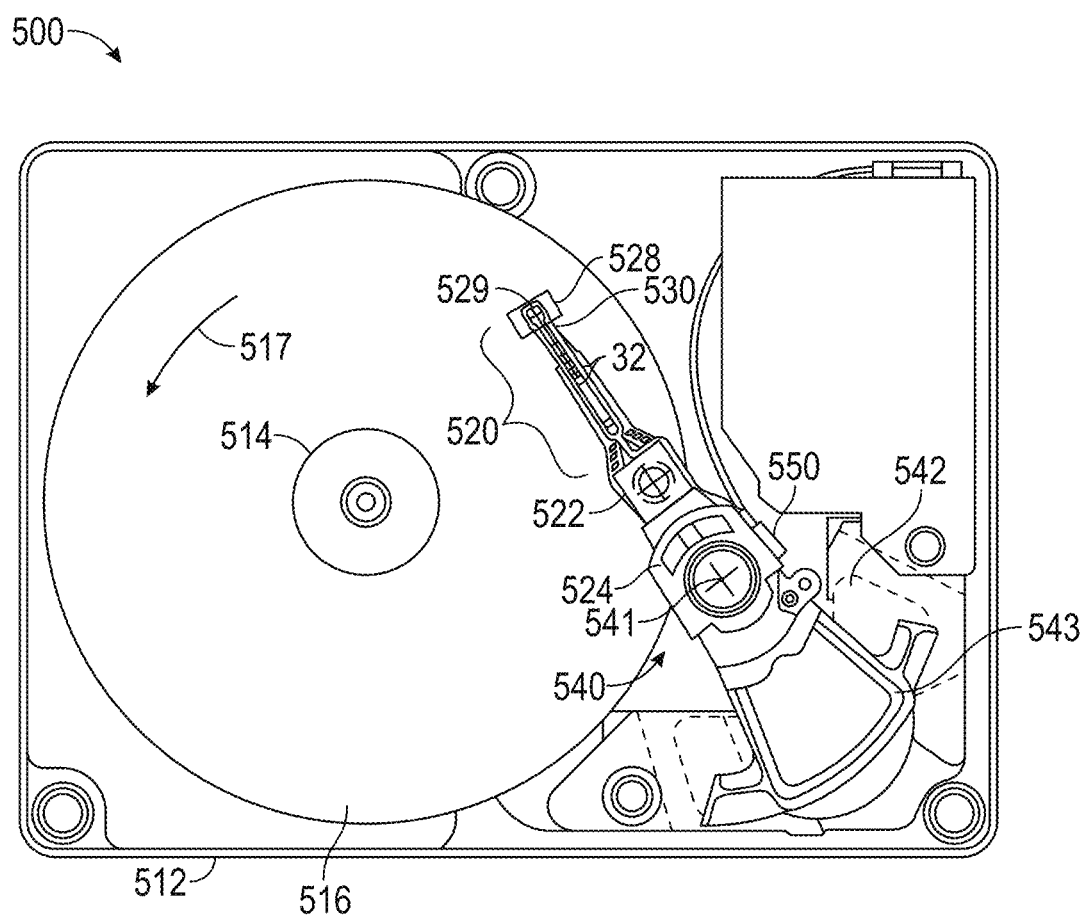
FIG. 1 is a top view of an example of a data storage device into which embodiments disclosed herein can be incorporated.

FIG. 1 is a top view of an example of a data storage device 500 (e.g., a HAMR data storage device or another type of data storage device) into which embodiments disclosed herein can be incorporated. FIG. 1 illustrates a head/disk assembly of the data storage device 500 with the cover removed. The data storage device 500 includes a rigid base 512 supporting a spindle 514 that supports a recording media 516 (or multiple recording media 516). The spindle 514 is rotated by a spindle motor (see FIG. 2), which, in operation, rotates the recording media 516 in the direction shown by the curved arrow 517. The data storage device 500 has at least one load beam assembly 520 having an integrated lead suspension (ILS) or flexure 530 with an array 32 of electrically conductive interconnect traces or lines. The at least one load beam assembly 520 is attached to rigid arms 522 connected to an E-shaped support structure, sometimes called an E-block 524. The flexure 530 is attached to a slider 528, which is typically formed of a composite material, such as a composite of alumina/titanium-carbide ($Al_2O_3$/TiC).

A recording head 529 for recording to a recording media 516 is located at the end or trailing surface of the slider 528. The recording head 529 comprises a read portion for reading from the recording media 516 and a write portion for writing to the recording media 516. FIG. 1 illustrates only one recording media 516 surface with the slider 528 and recording head 529, but there may be multiple recording media 516 stacked on a hub that is rotated by the spindle motor, with a separate slider 528 and recording head 529 associated with each surface of each recording media 516.

As the recording media 516 rotates, the recording media 516 drags gas (which may be air, helium, etc.) under the slider 528 in a direction approximately parallel to the tangential velocity of the recording media 516. The slider 528 has a media-facing air-bearing surface (ABS) that causes the slider 528 to ride on a cushion or bearing of gas, typically air, mostly helium, or hydrogen, generated by rotation of the recording media 516. (It is to be understood that the term "air-bearing surface (ABS)" is used herein to refer to the gas-bearing surface of a slider, regardless of whether the gas within the drive is air or another gas (e.g., predominantly helium) or a mixture of gases.) As the air or gas passes under the slider 528 ABS, compression of the air or gas along the air flow path causes the air pressure between the recording media 516 and the slider 528 to increase, which creates a hydrodynamic lifting force that counteracts the tendency of the at least one load beam assembly 520 to push the slider 528 toward the recording media 516. The slider 528 thus flies above the recording media 516 but in close proximity to the surface of the recording media 516. The flexure 530 enables the slider 528 to "pitch" and "roll" on the air (or gas) bearing generated by the recording media 516 as it rotates. Thus, during normal operation, the recording head 529 remains slightly above the surface of the recording media 516, riding on the air bearing.

The data storage device 500 of FIG. 1 also includes a rotary actuator assembly 540 rotationally mounted to the rigid base 512 at a pivot point 541. The rotary actuator assembly 540 may include a voice coil motor (VCM) actuator that includes a magnet assembly 542 fixed to the rigid base 512 and a voice coil 543. When energized by control circuitry, which may include, for example, a processor, the voice coil 543 moves and thereby rotates E-block 524 with the rigid arms 522 and the at least one load beam assembly 520 to position the read/write head over the data tracks on the recording media 516. As the recording media 516 rotates in the direction of the curved arrow 517 shown in FIG. 1, the movement of the rotary actuator assembly 540 allows the recording head 529 on the slider 528 to access different data tracks on the recording media 516. The array 32 of electrically conductive interconnect traces or lines connects at one end to the recording head 529 and at its other end to read/write circuitry contained in an electrical module or chip 550, which, in the data storage device 500 of FIG. 1, is secured to a side of the E-block 524. The chip 550 includes a read/write integrated circuit (R/W IC). The chip 550 may include a controller (e.g., as part of the R/W IC or external to it). The chip 550 may assist in the implementation of the techniques described herein.

To read information from the recording media 516, the recording head 529 may include at least one read head or read sensor. The read sensor(s) in the recording head 529 may include, for example, one or more giant magnetoresistance (GMR) sensors, tunneling magnetoresistance (TMR) sensors, or another type of magnetoresistive sensor. When the slider 528 passes over a track on the recording media 516, the recording head 529 (via the read head) detects changes in resistance due to magnetic field variations recorded on the recording media 516, which represent the recorded bits.

To write information to the recording media 516, the recording head 529 includes a write head (or write portion). In general, the write head can be any suitable write head.

Some of the examples included herein describe and illustrate a HAMR head, but it is to be appreciated that the disclosed techniques are applicable to other types of recording head 529.

In operation, after the voice coil 543 has positioned the recording head 529 over the data tracks on the recording media 516, the recording head 529 may be used to write information to one or more tracks on the surface of the recording media 516 and to read previously-recorded information from the tracks on the surface of the recording media 516. The tracks may comprise discrete data islands of magnetizable material (e.g., bit-patterned media), or the recording media 516 may have a conventional continuous magnetic recording layer of magnetizable material. Processing circuitry in the data storage device 500 (e.g., on the chip 550) provides to the recording head 529 signals representing information to be written to the recording media 516 and receives from the recording head 529 signals representing information read from the recording media 516.

As explained above, smear can be a problem for data storage devices 500 (e.g., HAMR devices). As also explained above, oxygen molecules in a sealed data storage device 500 tend to be consumed (e.g., the amount of oxygen decreases) as the data storage device 500 ages, which can make smear more of a problem. The rate of loss of oxygen is generally proportional to temperature.

What is needed are devices and techniques that allow additional oxygen to be introduced into a sealed data storage device 500 as it operates (e.g., to compensate for or replace oxygen lost/consumed as the data storage device 500 operates). Such techniques are described herein. Although the some of the discussion herein assumes that oxygen is lost/consumed during operation of the data storage device 500, it is to be appreciated that the disclosure is applicable to other gases or combinations of gases. Thus, generally speaking, the disclosures herein concern using a MOF container to release captive molecular units (stored in a MOF in the MOF container) into the interior of the enclosure of a data storage device 500.

FIG. 2 illustrates an example of some components of a data storage device 500 in accordance with some embodiments. The data storage device 500 example shown in FIG. 2 includes an enclosure 120, which may be, for example, a sealed enclosure. Within the enclosure 120 is a recording media 516. As explained above, the recording media 516 may be rotatable, in which case it may be coupled to a spindle motor 145.

The enclosure 120 also has within its interior a MOF container 105. Generally, the MOF container 105 can be any container that can use a MOF to store captive molecular units (e.g., oxygen) and release it into the enclosure 120 as the data storage device 500 ages. An example of a MOF container 105 is described further below in the discussion of FIGS. 3A and 3B.

In some embodiments, a heater 110 is optionally included within the enclosure 120. If included, the heater 110 may be used to heat the MOF container 105 to cause the MOF container 105 to release captive molecular units (e.g., oxygen) within the interior of the enclosure 120, as described further below.

In some embodiments, the data storage device 500 includes a controller 115. It will be appreciated that a controller 115 is a component, device, or subsystem that is responsible for managing and/or regulating the operation of an electric circuit and/or the devices connected to it. A controller 115 can monitor inputs, process information, and generate outputs to ensure that a circuit or system operates as intended. A controller 115 can be used to automate processes, maintain desired conditions, and/or provide control over various aspects of a system's behavior. It will be appreciated that a controller 115 can take various forms, ranging from simple analog devices, state machines, counters, etc. to sophisticated digital microcontrollers, programmable logic controllers (PLCs), etc. The controller 115 illustrated herein can take any suitable form. For example, the controller 115 can be a microcontroller (e.g., an integrated circuit that contains a processing unit (CPU), memory, and input/output ports) that can be programmed to perform the tasks described herein as being performed by a controller 115. As another example, the controller 115 can be a state machine implemented via suitable hardware (e.g., flip flops, gates, etc.). As another example, the controller 115 can be a PLC (e.g., a specialized digital computer that can monitor inputs, make decisions based on programmed logic, and control outputs to automate various processes). As another example, the controller 115 can be a digital signal processor (DSP) programmed to carry out the tasks described herein as being performed by the controller 115.

If present, the controller 115 may be communicatively coupled to the heater 110 (if present) and/or the spindle motor 145 (if present). It is to be appreciated that the spindle motor 145 is described herein as optional in two senses. First, the spindle motor 145 is optional in the sense that the data storage device 500 might not include a spindle motor 145 (e.g., if the data storage device 500 does not use recording media 516 that spin). Second the spindle motor 145 is optional in the sense that even if the data storage device 500 includes a spindle motor 145, as explained further below, the techniques described herein for adjusting the content or concentration of a gas need not involve the spindle motor 145. The controller 115 may be configured to monitor conditions within the interior of the enclosure 120 and take actions to adjust the content or concentration of a gas (e.g., oxygen) within the enclosure 120. For example, the controller 115 may be configured to cause the heater 110 to produce heat in response to the controller 115 determining that more of the stored captive molecular units (e.g., oxygen) should be added to the interior of the enclosure 120.

In some embodiments, the data storage device 500 includes a sensor 125. If present, the sensor 125 may be coupled to the controller 115 to allow the controller 115 to collect readings, measurements, status information, or other information from the sensor 125. In some embodiments, the sensor 125 is an oxygen sensor included in the data storage device 500 to monitor the amount or concentration of oxygen within the interior of the enclosure 120. In some such embodiments, the controller 115 can use readings or measurements from the oxygen sensor to determine whether and/or when to cause the MOF container 105 to release oxygen. For example, when the sensor 125 is an oxygen sensor and the heater 110 is present, the controller 115 can use readings or measurements from the sensor 125 to estimate or determine how much oxygen is in within the enclosure 120 and/or to decide how to control the heater 110 (e.g., when to turn on the heater 110, what setting(s) to apply to the heater 110, how long to leave the heater 110 on, etc.).

In some embodiments, the sensor 125 is a sensor that provides other information that the controller 115 can use to monitor or estimate the level of a specified gas (e.g., oxygen) within the enclosure 120 and/or to make decisions as to whether to take action to increase the gas level within the enclosure 120. For example, the sensor 125 may be a temperature sensor, and the specified gas may be oxygen. As explained above, the oxygen loss rate within a sealed enclosure 120 may increase with temperature. Accordingly, in some embodiments, the controller 115 can estimate oxygen loss based at least in part on temperature readings from the sensor 125. For example, the controller 115 may have access to a model that allows it to estimate how much oxygen has been lost/consumed given the temperature within the enclosure (e.g., a collection of temperatures over time). In embodiments in which the data storage device 500 also includes a heater 110, the controller 115 can use the estimate of the amount of gas lost/consumed (and/or the estimated amount of oxygen remaining) to decide how to control the heater 110 (e.g., when to turn on the heater 110, how long to leave the heater 110 on, etc.).

As another example, the sensor 125 may be a current sensor. Such a sensor 125 may provide a proxy for the level of a specified gas (e.g., oxygen) within the enclosure 120. For example, the sensor 125 may be coupled to the spindle motor 145 so that it can provide an indication of the current being used by the spindle motor 145 to cause the recording media 516 to rotate at a specified speed (e.g., the angular speed at which the recording media 516 ordinarily spins when the data storage device 500 is being used). As explained above, when the oxygen content within the enclosure 120 is higher, the current required to maintain a specified rotation speed is higher than when the oxygen content is lower. Accordingly, the spindle motor 145 current used to rotate the recording media 516 at a specified angular speed is a proxy for the oxygen content within the enclosure 120: when the current is higher, more oxygen is present, and when the current is lower, less oxygen is present.

As another example, the sensor 125 may be any sensor that provides an indication of power consumption (e.g., a voltmeter, a resistor, etc.). Such a sensor 125 can be used like the current sensor described above, e.g., to provide a proxy for gas (e.g., oxygen) content based on operation (e.g., power consumption) of the spindle motor 145.

It will be appreciated that although the description above assumes that the spin speed is constant, it is also possible to assess the gas (e.g., oxygen) content within the enclosure 120 based on a constant current, voltage, and/or power of the spindle motor 145. In other words, the gas (e.g., oxygen) content could be estimated by setting a current, voltage, and/or power of the spindle motor 145 and observing how fast the recording media 516 spins at that setting. In the case that the gas of interest is oxygen, the spin speed of the recording media 516 will be higher when the oxygen content is lower than when the oxygen content is higher.

Although FIG. 2 illustrates the illustrated elements of the data storage device 500 as being inside of the enclosure 120, it is possible for some of the components to be located outside of the enclosure 120. As one example, the controller 115 could be situated outside of the enclosure 120 (e.g., in a host device, such as a computer or processor connected to the data storage device 500).

FIGS. 3A and 3B illustrate an example of the MOF container 105 in accordance with some embodiments. In the example of FIGS. 3A and 3B, the MOF container 105 has a permeable membrane 107 and contains a gas-storing substance 150. The gas-storing substance 150 can be any substance (e.g., a liquid, a powder, etc.) that can store and release a gas that is desirable to have within the enclosure 120. The pressure inside of the MOF container 105 can exceed the pressure outside of the MOF container 105 and inside the enclosure 120 so that gas flows only out of the MOF container 105 through the permeable membrane 107 (and not into the MOF container 105). As an alternative or in addition to the permeable membrane 107, gas can flow out of the MOF container 105 via an orifice of (e.g., an opening in) the MOF container 105.

In some embodiments, the gas-storing substance 150 is a metal-organic framework (MOF). As will be appreciated, MOFs, which are sometimes referred to as porous coordination polymers, are materials that are composed of metal ions or clusters coordinated to organic molecules, forming a porous three-dimensional structure. In a MOF, metal ions or metal clusters (e.g., transition metals like zinc, copper, or aluminum) are connected by organic ligands that serve as linkers between the metal centers. The arrangement of metal ions and organic ligands creates a porous structure with a large internal surface area. Because of the porous nature of MOFs, they can be used to capture certain molecules or atoms, which can be referred to as "captive molecular units," and release those captive molecular units in gaseous form. MOFs can thus be particularly efficient for storage of molecules or atoms that will help replenish gas depletion in certain environments. The porosity of a MOF can be adjusted by modifying the choice of metal ions and ligands, which allows the size and shape of the pores to be adjusted. The adsorption and desorption of captive molecular units by a MOF can be a function of (e.g., controlled by) a variety of conditions/variables, such as, for example, one or more of temperature, pressure, or light.

In embodiments in which the gas-storing substance 150 is a MOF, the MOF can be any suitable material or combination of materials. Examples of suitable MOFs include: Cd(bpndc)(4,4'-bpy), Co-BTTri, Co-BDTriP, Co-MOF-74, Co-MOF-74 Composite, $Cr_3(BTC)_2$, Cr-BTT, Cu(BDT), Cu(BDTri)L (L=DMF), $Cu_3(BTC)_2$, Cu-BTC, Cu-BTC Composite, Fe-MOF-74, $Mg_3(NDC)_3$, MIL-100 (Fe), MIL-100 (Sc), MIL-101 Composite, MOF-177, PCN-13, PCN-17, PCN-224FeII, UMCM-1, Zn(TCNQ-TCNQ)bpy, $K_{1.09}Fe_2(bdp)_3$, $K_{0.82}Fe_2(bdp)_3$, $K_{1.88}Fe_2(bdp)_3$, $K_{2.07}Fe_2(bpeb)_3$, Ni-MOF-74, $Ni_2$(cyclam)$_2$(mtb), MIL-101 (Ti), Fe-BTTri, Cu(BDTri)L (L=DEF), $Co_2Cl_2$(BBTA), $Co_2(OH)_2$(BBTA), Mg-MOF-74, HKUST-1 (Hong Kong University of Science and Technology-1), UMCM-152 (ANUGIA), DIDDOK, XAWVUN&XEBHOC, COF-300, MIL-88C, NU-125, NU-1103, ZIF-8, and/or a zirconium-based MOF (e.g., UiO-66, NU-1000, etc.). It is to be appreciated that these MOFs are merely examples, and that this list of examples is not intended to be limiting or comprehensive.

In some embodiments, the gas-storing substance 150 comprises Cu-BTC (also known as HKUST-1). The metal component in Cu-BTC is copper ions, which are coordinated with organic ligands to form the framework of the MOF. BTC is an abbreviation for benzene-1,3,5-tricarboxylic acid. This organic ligand serves as a linker in the MOF structure, connecting the copper ions to create a porous network. Cu-BTC can adsorb significant amounts of oxygen at relatively low pressures and temperatures. Cu-BTC has a distinctive paddlewheel structure, with copper ions bonded to three carboxylate groups from the BTC ligands. Cu-BTC has high thermal stability and exceptional surface area. The inventors' experiments using Cu-BTC have shown that it is a suitable gas-storing substance 150 in implementing the techniques described herein. It is to be appreciated, however, that the gas-storing substance 150 can be made from any suitable material and is not limited to Cu-BTC.

Referring again to FIG. 2, in embodiments in which the MOF container 105 contains a MOF as the gas-storing substance 150, the MOF can be selected so that the release of gas by the MOF can be controlled. For example, the MOF can be selected so that at ordinary operating temperatures, the MOF does not release captive molecular units (e.g., oxygen). When it is desirable to release captive molecular units into the enclosure 120, the controller 115 can turn on or adjust the heater 110, which can cause captive molecular units (e.g., oxygen) stored in the MOF container 105 to flow out of the MOF container 105 through the permeable membrane 107 and into the interior of the enclosure 120, which may be sealed.

Figure 4:
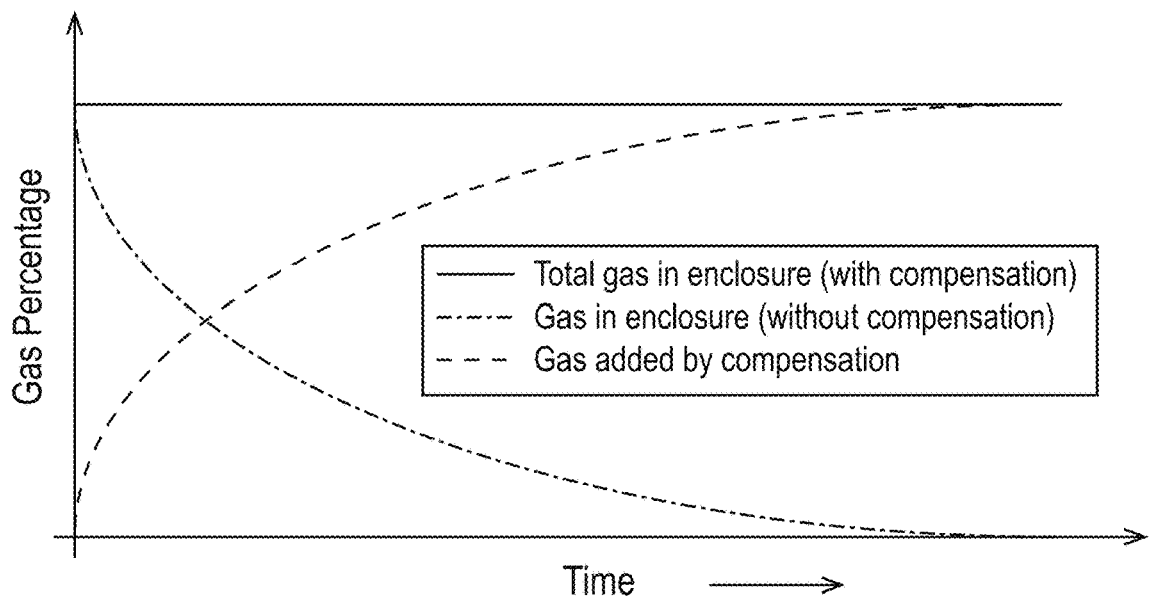
FIG. 4 is a conceptual plot showing the effect of releasing gas over time in accordance with some embodiments.

FIG. 4 is a conceptual plot showing the effect of the gas-storing substance 150 in the MOF container 105 releasing captive molecular units over time in accordance with some embodiments. As shown in FIG. 4, without gas compensation, the percentage of gas within the enclosure 120 can decrease as time passes. To compensate, the gas-storing substance 150 can release captive molecular units (e.g., oxygen) over time in amounts to replace the lost gas. Ideally, the total amount of a particular gas (e.g., oxygen) in the enclosure 120 remains substantially constant (or within a range) over time because of the captive molecular units released by the gas-storing substance 150.

Figure 5:
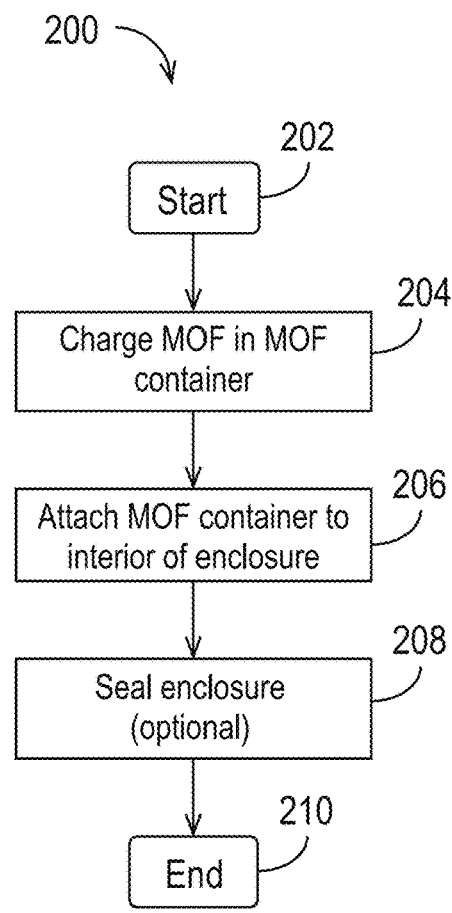
FIG. 5 is a flow diagram of a method of manufacturing a data storage device with a MOF container in accordance with some embodiments.

FIG. 5 is a flow diagram of a method 200 of manufacturing a data storage device 500 in accordance with some embodiments. At block 202, the method 200 begins. At block 204, a MOF container is charged. For example, when the gas-storing substance 150 comprises a MOF, block 204 may comprise charging the MOF, which is the process of introducing gas molecules (e.g., oxygen) into the MOF's porous structure or onto its surface. As will be appreciated by those having ordinary skill in the art, the specific method for charging a MOF can vary depending on the desired outcome and the MOF's properties. In some embodiments, after choosing and synthesizing a MOF (e.g., by mixing metal ions or clusters with organic ligands in a solvent under controlled conditions to promote MOF formation), guest molecules or solvents in the pores of the MOF that are used in the synthesis process can be removed by heating the MOF under vacuum or flowing an inert gas to remove the guest molecules. The MOF can then be exposed to the desired gas or vapor, such as, for example, by immersing the MOF in a sealed container with the gas (e.g., oxygen) or by using a vacuum to facilitate the process.

At block 206, the MOF container 105 is attached to the interior of the enclosure 120. It may be convenient for the block 206 to follow the block 204, but it is not a requirement for the block 206 to follow the block 204.

At block 208, the enclosure 120 is sealed. Although sealing the enclosure 120 in block 208 may be advantageous, it is not a requirement. There may be applications in which a non-sealed enclosure 120 can benefit from the techniques and devices disclosed herein, such that the MOF container 105 could release stored captive molecular units into a non-sealed enclosure 120 (e.g., in a directed manner to increase the concentration of oxygen molecules in locations where smear might form). Accordingly, the block 208 is optional.

At block 210, the method 200 ends.

Figure 6:
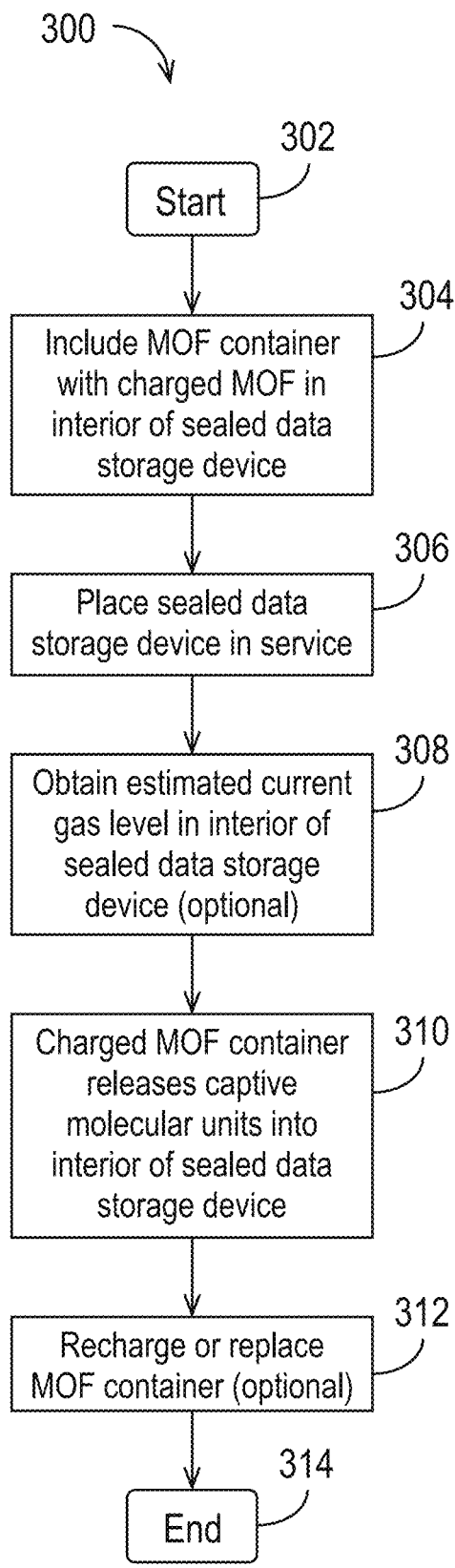
FIG. 6 is a flow diagram of a method of adjusting an amount of gas in a sealed data storage device in accordance with some embodiments.

FIG. 6 is a flow diagram of a method 300 of adjusting an amount of gas in a sealed data storage device (e.g., the data storage device 500) in accordance with some embodiments. At block 302, the method begins. At block 304, a charged MOF container 105 is included in the enclosure 120 of a data storage device 500, which is a sealed data storage device 500. The data storage device 500 may have a mixture of gases in the interior of the enclosure 120 (e.g., a mixture of helium and oxygen).

At block 306, the data storage device 500 is placed in service (e.g., tested in a lab, used with a computer, used by a consumer, etc.).

Optionally, at block 308, an estimate of a gas level (e.g., an amount, a concentration, a percentage, etc.) in the interior of the data storage device 500 (e.g., in the enclosure 120) is obtained. As described above, the estimate can be based on a measurement of the gas (e.g., using a sensor 125), or the estimate can be determined using a proxy for gas quantity (e.g., temperature, spindle motor 145 current or power consumption, etc.). The estimated gas level can be taken into account (e.g., by a controller 115) to determine whether and how much of the stored captive molecular units to release from the MOF container 105.

At block 310, the charged MOF container 105 releases stored captive molecular units into the interior of the data storage device 500 (e.g., in the interior of the enclosure 120). The captive molecular units can be released in response to finding that a quantity or concentration of gas in the interior of the enclosure 120 is below a threshold. In some embodiments, as described above, the release of captive molecular units can be a consequence of heating the MOF container 105. Alternatively or in addition, the release of captive molecular units can be a consequence of increasing a pressure differential between the interior of the MOF container 105 and the interior of the enclosure 120. Alternatively or in addition, the release of captive molecular units can be a consequence of applying a magnetic field to the MOF container 105 or exposing the MOF container 105 to light.

The quantity of captive molecular units released (or the amount of time for which captive molecular units are released) during the block 310 can be based, at least in part, on a model. For example, the properties and quantity of the MOF can be taken into account. If used, the model can account for an operating temperature of the data storage device 500 (e.g., a current operating temperature, an average temperature during the life-to-date of the data storage device 500, historical operating temperature data for the data storage device 500 (e.g., since being placed into service), etc.). Alternatively or in addition, the model can account for an operating time of the data storage device 500 (e.g., since being placed into service). Alternatively or in addition, the model can account for an expected lifetime of the data storage device 500 (e.g., to attempt to match the release of stored captive molecular units with the lifetime of the data storage device 500 so that when all of the captive molecular units have been released from the MOF container 105, the data storage device 500 is expected to have reached the end of its lifetime).

Optionally, at block 312, the MOF container 105 is replaced or recharged. For example, after a certain amount of time, the data storage device 500 can be serviced and the MOF container 105 either recharged or replaced.

At block 314, the method 300 ends.

Figure 7:
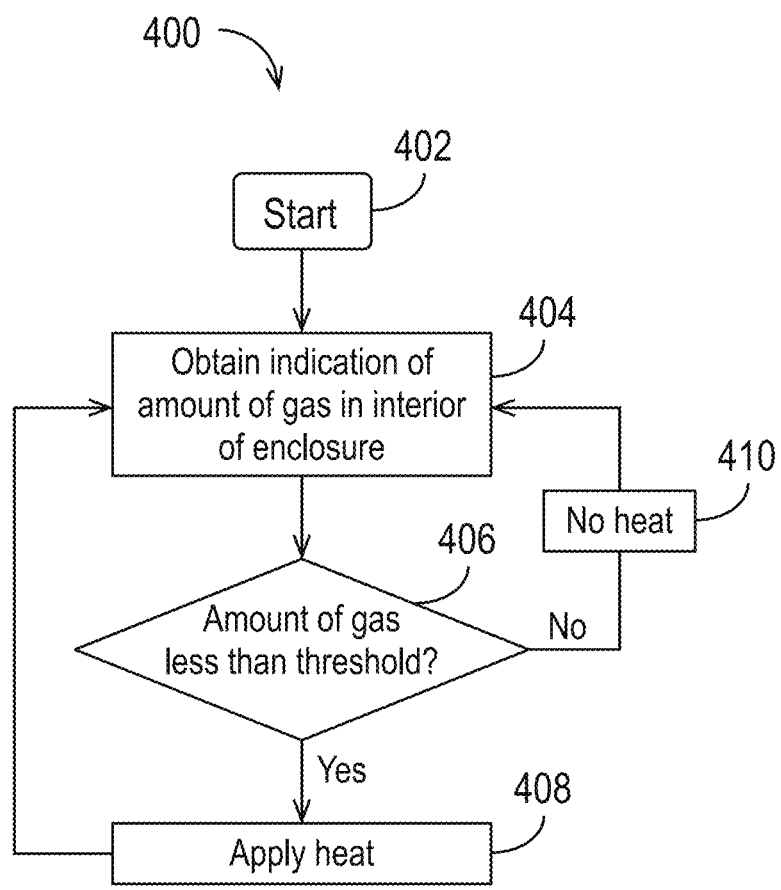
FIG. 7 is a flow diagram illustrating a method performed to adjust an amount of gas in a data storage device that comprises a heater in accordance with some embodiments To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

FIG. 7 is a flow diagram illustrating a method 400 performed (e.g., by a controller 115) to adjust an amount of gas in a data storage device 500 that comprises a heater 110 in accordance with some embodiments. At block 402, the method 400 begins. At block 404, the controller 115 obtains an indication of an amount of gas in the interior of the enclosure 120. The indication could be, for example, an indication of an absolute quantity of gas in the enclosure 120, or an indication of a relative quantity (e.g., a percentage) of gas in the enclosure 120. The indication could be obtained, for example, from a sensor 125 (e.g., an oxygen sensor, a temperature sensor, etc.). Alternatively or in addition, the indication could be obtained indirectly (e.g., based on a power consumption or current of a spindle motor 145, etc.).

At block 406, the controller 115 determines whether the amount of gas is less than a threshold. The threshold could be, for example, a target gas percentage for the data storage device 500. For example, there could be a target oxygen percentage that it is desirable to maintain during the lifetime of the drive. At block 406, the controller 115 can determine whether the actual oxygen percentage meets the target oxygen percentage by comparing the indication from block 404 to the target value.

If, at block 406, the amount of oxygen is not less than a threshold, the method 400 proceeds to the block 410, and no heat is applied (e.g., the heater 110 is off). As a result, the MOF container 105 does not release captive molecular units into the enclosure 120 interior. As long as the amount of gas in the interior of the enclosure is above the threshold, the controller 115 can simply monitor the quantity of gas by looping through block 404, block 406, and block 410.

If, at block 406, the controller 115 finds that the amount of gas is less than the threshold, then at block 408, the controller 115 applies heat (e.g., by turning on and/or adjusting the level of the heater 110). As explained above, the heater 110 can cause the MOF to release captive molecular units, which can flow through the permeable membrane 107 and into the interior of the enclosure 120.

The method 400 then proceeds back to block 404, where the controller 115 obtains another indication of the amount of gas in the enclosure 120. If, at block 406, the amount continues to be less than the threshold, the controller 115 leaves the heater on at block 408, and the method 400 reverts to block 404. If, at block 406, the amount of gas is no longer less than the threshold, the method proceeds to block 410, where no heat is applied (e.g., the heater 110 is turned off). The method 400 then returns to block 404.

FIG. 7 can be modified if the release of captive molecular units from the MOF container 105 is controlled by mechanisms other than heat, but the steps will be similar (e.g., instead of applying or not applying heat, the controller 115 could apply or not apply pressure to the MOF container 105 contents, or the controller 115 could apply or not apply a magnetic field to the MOF container 105, or the controller 115 could expose or not expose the MOF container 105 or its contents to light, etc.).

It is to be appreciated that although some of the descriptions herein discuss the use of the MOF container 105 to store oxygen that can then be released into the interior of an enclosure 120 as a data storage device 500 operates, the same principles can be used to replenish alternative or additional gases. In other words, the MOF container 105 could be used to store and release captive molecular units of a different gas than oxygen (e.g., helium, nitrogen, hydrogen, etc.), or it could store a combination of captive molecular units that could then be released.

It is also to be appreciated that although the descriptions above and elsewhere herein refer to the use of a heater 110 to release captive molecular units into the enclosure 120, it is possible to use alternative or additional techniques to promote the release of captive molecular units from the MOF container 105. For example, a pressure differential between the interior of the MOF container 105 and the interior of the enclosure 120 can be increased to force captive molecular units to flow through the permeable membrane 107 of the MOF container 105 and into the interior of the enclosure 120. In other words, the pressure differential may allow stored captive molecular units to exit the MOF container 105. As another example, the gas-storing substance 150 can include a stimuli-responsive material incorporated in a MOF, and a magnetically induced heating process can be used to release the captive molecular units. As a specific example, a mixture of magnetic nanoparticles (e.g., $MgFe_2O_4$) mixed with Cu-BTC nanoparticles can be subjected to a magnetic field of a suitable strength at a suitable frequency to heat the mixture and release the stored captive molecular units. Accordingly, the heater 110 can be replaced by or augmented with other components, such as a magnetic field generator or a pressure generator.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As another example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A data storage device, comprising:
 a sealed enclosure;
 a spindle motor situated within an interior of the sealed enclosure;
 a metal organic framework (MOF) container situated within the interior of the sealed enclosure, wherein the MOF container contains a MOF configured to store captive molecular units and to release the captive molecular units in gaseous form into the interior of the sealed enclosure;
 a heater situated within the interior of the sealed enclosure, wherein the heater is configured to heat the MOF; and
 a controller coupled to the heater, wherein the controller is configured to set or adjust a heat output of the heater based at least in part on an indication of an amount or concentration of a gas within the interior of the sealed enclosure, the indication of the amount or concentration of the gas within the interior of the sealed enclosure being based at least in part on one or more of: a current of the spindle motor, a power consumption of the spindle motor, a proxy for the current of the spindle motor, or a proxy for the power consumption of the spindle motor.

2. The data storage device recited in claim 1, wherein the captive molecular units comprise oxygen ($O_2$).

3. The data storage device recited in claim 1, wherein the MOF comprises at least one of: Cu-BTC, MIL-101 Composite, UMCM-152 (ANUGIA), or Mg-MOF-74.

4. The data storage device recited in claim 1, wherein the MOF container comprises a permeable membrane and/or orifice configured to allow the captive molecular units to exit the MOF container.

5. The data storage device recited in claim 1, wherein the indication is a first indication of the amount or concentration of the gas within the interior of the sealed enclosure, and further comprising a sensor communicatively coupled to the controller, and wherein the controller is further configured to obtain a second indication of the amount or concentration of the gas within the interior of the sealed enclosure from the sensor.

6. The data storage device recited in claim 1, wherein the controller is further configured to control the heater by setting or adjusting the heat output of the heater based at least in part on an indication of a temperature within the interior of the sealed enclosure.

7. The data storage device recited in claim 1, further comprising:
 a recording medium situated within the interior of the sealed enclosure; and
 a heat-assisted magnetic recording (HAMR) head situated within the sealed enclosure and configured to record data to and read data from the recording medium.

8. A method of manufacturing the data storage device recited in claim 1, the method comprising:
 charging the MOF;
 before sealing the sealed enclosure, attaching the MOF container to the interior of the sealed enclosure; and
 sealing the sealed enclosure after attaching the MOF container to the interior of the sealed enclosure.

9. A method of adjusting an amount of gas in a sealed data storage device, the method comprising:
 including a metal organic framework (MOF) container within an interior of the sealed data storage device, the MOF container containing a MOF;
 charging the MOF; and
 after the sealed data storage device has been placed into service:
  obtaining an estimated current gas level in the interior of the sealed data storage device, wherein obtaining the estimated current gas level in the interior of the sealed data storage device comprises obtaining an indication of a spindle motor current or a spindle motor power consumption;
  at least in part in response to the estimated current gas level in the interior of the sealed data storage device, a controller of the sealed data storage device causing a heater of the sealed data storage device to heat the MOF container; and
  the MOF releasing captive molecular units into the interior of the sealed data storage device at least in part in response to the heating of the MOF container.

10. The method of claim 9, wherein the controller of the sealed data storage device causing the heater of the sealed data storage device to heat the MOF container is at least in part in response to the estimated current gas level in the interior of the sealed data storage device being below a threshold.

11. The method of claim 9, wherein the controller of the sealed data storage device causing the heater of the sealed data storage device to heat the MOF container is further based at least in part on a model.

12. The method of claim 11, wherein the model accounts for a material in the MOF.

13. The method of claim 12, wherein the model also accounts for at least one of (a) an operating temperature of the sealed data storage device, (b) an operating time of the sealed data storage device, or (c) an expected lifetime of the sealed data storage device.

14. The method of claim 9, further comprising subjecting the MOF to a magnetic field, and wherein the MOF releasing the captive molecular units into the interior of the sealed data storage device is further in response to subjecting the MOF to the magnetic field.

15. The method of claim 9, further comprising exposing the MOF to light, and wherein the MOF releasing the captive molecular units into the interior of the sealed data storage device is further in response to exposing the MOF to the light.

16. The method of claim 9, further comprising:
 recharging or replacing the MOF.

17. The data storage device recited in claim 4, wherein a pressure inside the MOF container exceeds a pressure in the interior of the sealed enclosure.

* * * * *